United States Patent [19]

Mutoh et al.

[11] Patent Number: 4,733,454
[45] Date of Patent: Mar. 29, 1988

[54] METHOD FOR INTEGRATING A BOOT PISTON INTO A DISK BRAKE

[75] Inventors: Hideo Mutoh, Kasukabe; Tadashi Otsuji, Iwatsuki, both of Japan

[73] Assignee: Akebono Brake Industry Co., Ltd., Tokyo, Japan

[21] Appl. No.: 884,079

[22] Filed: Jul. 10, 1986

[51] Int. Cl.⁴ ............................................. B23P 11/02
[52] U.S. Cl. ................................ 29/450; 29/156.4 R; 29/421 R; 29/454
[58] Field of Search .................... 29/421 R, 428, 446, 29/450, 451, 454, 156.5 R

[56] References Cited

U.S. PATENT DOCUMENTS 3,866,299  2/1975  Gregg et al. .................... 29/450 X Primary Examiner—Howard N. Goldberg
Assistant Examiner—Ronald S. Wallace
Attorney, Agent, or Firm—Oblon, Fisher, Spivak, McClelland & Maier

[57] ABSTRACT

The piston boot is first set at the middle portion of a cylinder jig having a small diameter upper step portion and a large diameter lower step portion with the middle portion position therebetween and having radial air blow off vents. The upper step portion is then inserted into an inner circumferential face of a piston while simultaneously advancing the lower step portion toward an end face of the piston from which the inner circumferential face extends and blowing air from the blow off vents, as a result of which the piston boot is radially expanded and fitted on an outer circumference of the piston adjacent the end face. A cup form jig slidably fitted around the lower step portion is then advanced toward the piston boot and further advances the piston boot until the piston boot is fitted into a piston boot fitting portion of the piston.

2 Claims, 6 Drawing Figures

FIG. I
(A)
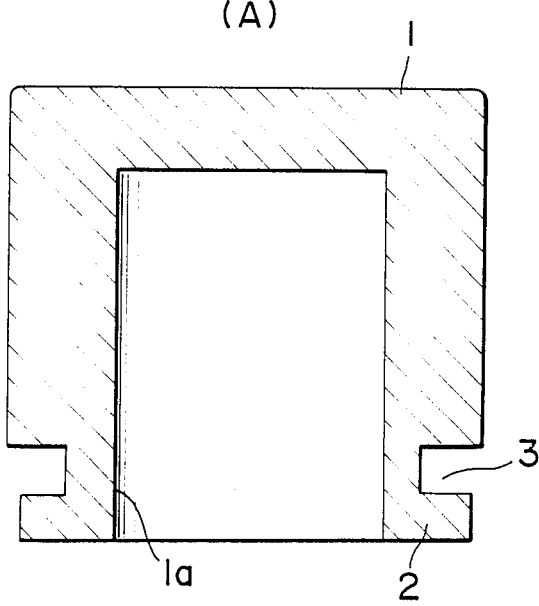
FIG. I (B)
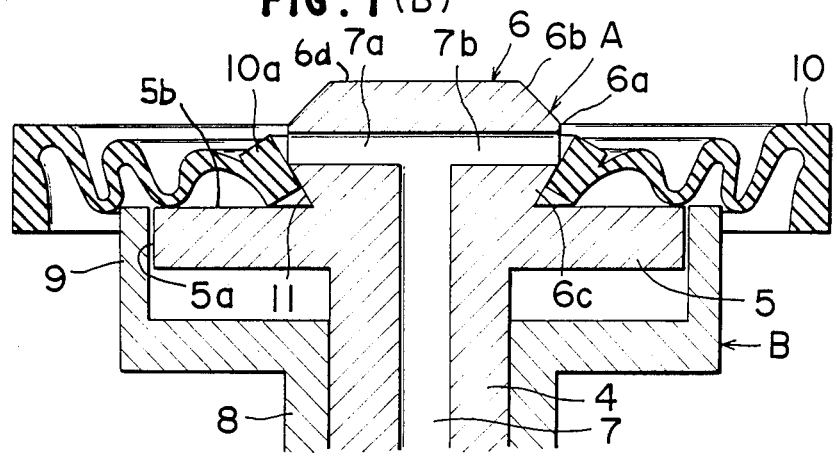

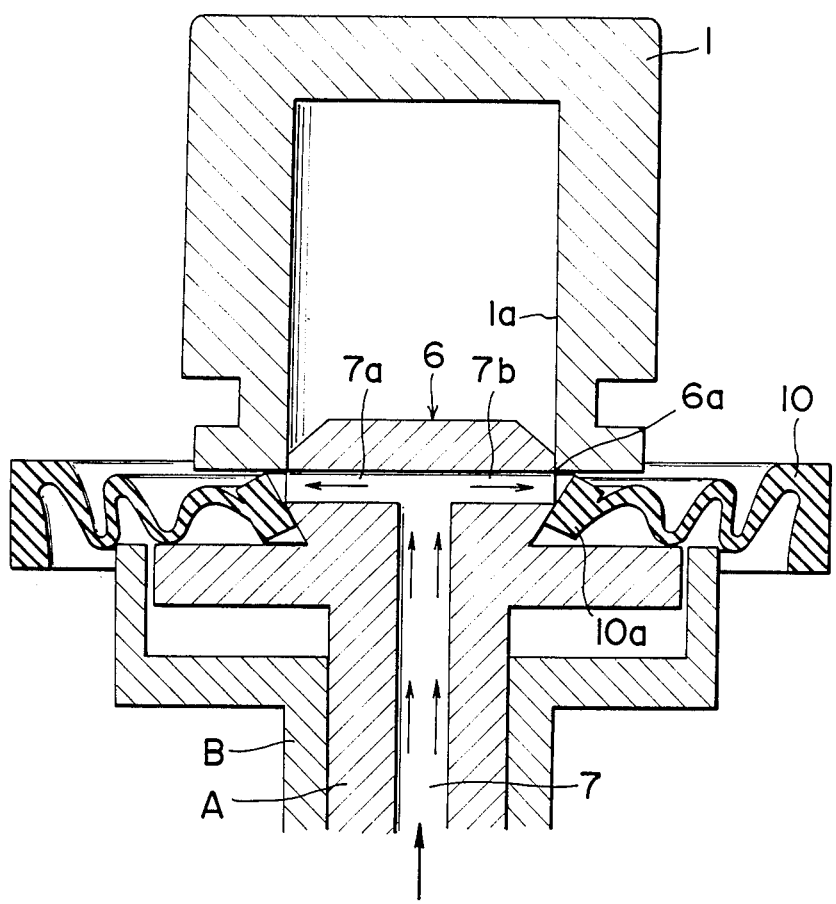

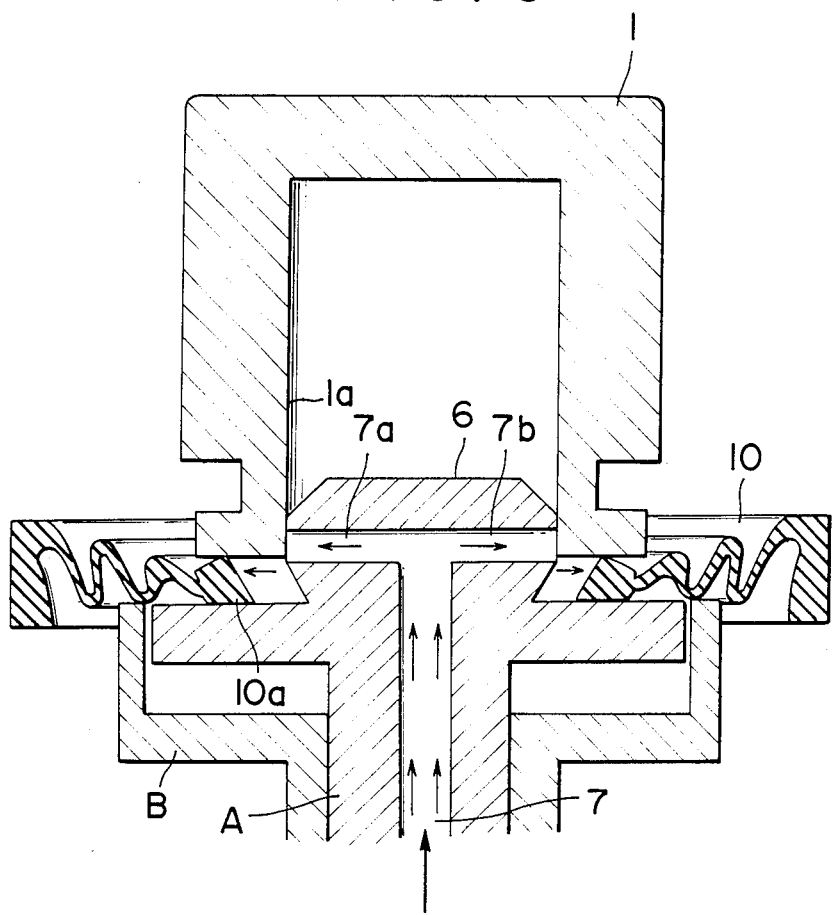

METHOD FOR INTEGRATING A BOOT PISTON INTO A DISK BRAKE

BACKGROUND OF THE INVENTION

1. Field of the Invention

The present invention relates to a method for integrating a piston boot into the operative end portion of piston constituting the oil pressure responsive actuator of a disk brake for a vehicle.

2. Brief Description of the Related Art

Since the integration of a piston boot has been made by handwork up to this time, not only is the efficiency low, but also a delicate action of the fingers is needed and, with the exception of experts, it is impossible to perform integration rapidly and surely. These have been significant drawbacks in proceeding with the automatic assembling of a disk brake.

SUMMARY OF THE INVENTION

The object of the invention is to cope with such problems, and provides a method aimed at labor saving, wherein by setting an integrating tool of a piston boot at the operative end portion of a piston, the piston boot is pushed into the fitting groove for the piston boot provided above the outer circumference of the operative end portion of the piston through two processes, to be integrated automatically.

Specifically, the invention defines a method for integrating a piston boot into a disk brake by setting the piston boot at the middle portion of a cylinder jig, the middle portion being positioned between a small diameter upper step portion and a large diameter lower step portion and having radial air blow off vents. Subsequently, the upper step portion is inserted into an inner circumferential face of the piston while simultaneously advancing the lower step portion toward and end face of the piston from which the inner circumferential face extends and blowing air from the blow off vents, as a result of which the piston boot is radially expanded and fitted on an outer circumference of the piston adjacent the end face. Finally, a cup form jig slidably fitted around the lower step portion is advanced toward, and into engagement with, the piston boot and the piston boot is thus advanced until it is fitted into a piston boot fitting portion of the piston. The middle portion can include a column portion defining a groove, wherein an inner end portion of the piston boot is fitted in the groove during the step of setting the piston boot at the middle portion of the cylinder jig.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings:

FIG. 1(A) shows a piston in section;

FIG. 1(B) shows a piston boot mounted on the integrating tool, with FIG. 1(A) and 1(B) together showing the orientation of the piston and integrating tool in a first phase of operation according to the invention; and FIGS. 2–5 sequentially show subsequent phases of operation according to the invention.

DETAILED DESCRIPTION OF THE PREFERRED EMBODIMENT

Figure 4:
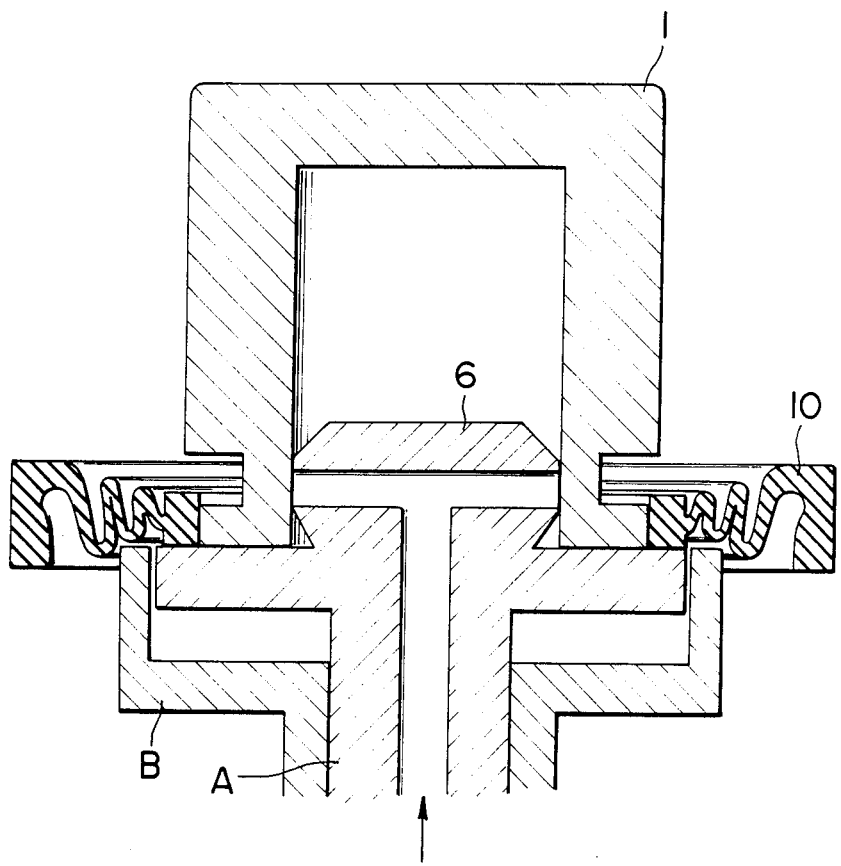

In the following, a preferred embodiment will be illustrated using the drawings.

FIG. 1(A) shows piston (1) fixed by a jig (not shown in the figure) with an operative end portion (2) extending downward. Piston (1) may be in a state integrated into the body of a brake. The reference numeral (3) is a fitting groove for a piston boot. An integrating tool for the piston boot consists of a combination of jig A and jig B as shown in FIG. 1(B).

For jig A, a circular plate-like portion (5) is formed at the upper side of a thick cylinder portion (4) and has a surface defining a lower step portion (5b), so that the vertical section is in a T-shape. Further, at the upper side of the center thereof is a conical column portion (6) having cone portions (6b), (6c) symmetrically above and below a column portion (6a) and defining upper step portion (6d) having a larger diameter than lower step portion (5b). Through the center of the cylinder portion (4) passes an airsupplying hole (7) having a large number of branches (7a), (7b) extending toward the outer circumference of the column portion (6a) (middle portion of the jig A) of conical column portion (6), with openings arranged radially in the horizontal direction. This air-supplying hole (7) leads to an air-pressurizing device (not shown in the Figures) such as an air compressor etc. Moreover, the outer diameter of the column portion (6a) of conical column portion (6) is sized so as to be fitted slidably into the inner circumferential face (1a) of piston (1) while the outer diameter of the circular plate-like portion (5) is set to be somewhat larger than that of the operative end portion (2) of the piston.

Jig B to be combined with jig A consists of a lower cylinder portion (8) to be slidably fitted to the cylinder portion (4) of jig A and, via a horizontal portion, a cylinder portion of expanded diameter (9) having an opening close to the outside of the outer circumferential face (5a) of circular plate-like portion (5) of jig A. The height of the cylinder portion of expanded diameter (9) is set to be somewhat larger than the thickness of the circular plate-like portion (5).

For integrating by fitting piston boot (10) into the piston boot fitting groove (3) on piston (1) using the integrating piston boot tool consisting of the combination of jig A and jig B as described, as shown in FIG. 1(B), first the piston boot (1) is fitted on the middle portion adjacent of the circular plate-like portion (5) so that an inner end portion (10a) thereof is fitted into a groove (11) formed between the cone portion (6c) of conical column portion (6) of jig A and the circular plate-like portion (5).

Then, with the integrating tool so fitted with the piston boot (10), as shown in FIG. 2, upper step portion (6d) of the column portion (6a) of conical column portion (6) of jig A is fitted into the inner circumferential face (1a) of piston (1) and, at the same time, by supplying pressurized air through the air-supplying hole (7) to be emitted from the branched openings (7a), (7b) to the outer circumference thereof, the inner end portion (10a) of piston boot (10) is expanded outward.

By use of this expansion by the pressurized air, the inner end portion (10a) of piston boot (10) is subjected to increased expansion as shown in FIG. 3, while the conical column portion (6) of jig A also gradually rises into the inner circumferential face (1a) of the piston. Following this, the inner end portion (10a) of piston boot (10) is subjected to further increased expansion and reaches the outer circumferential face (2a) of the operative end portion (2) of the piston. At this time, by being pressed from below by the circular plate-like portion (5) rising with the rise of jig A, the inner end portion (10a) of piston boot (10) is fitted into the outer circumferential face (2a) of the operative end portion (2) of the piston as shown in FIG. 4.

Figure 5:
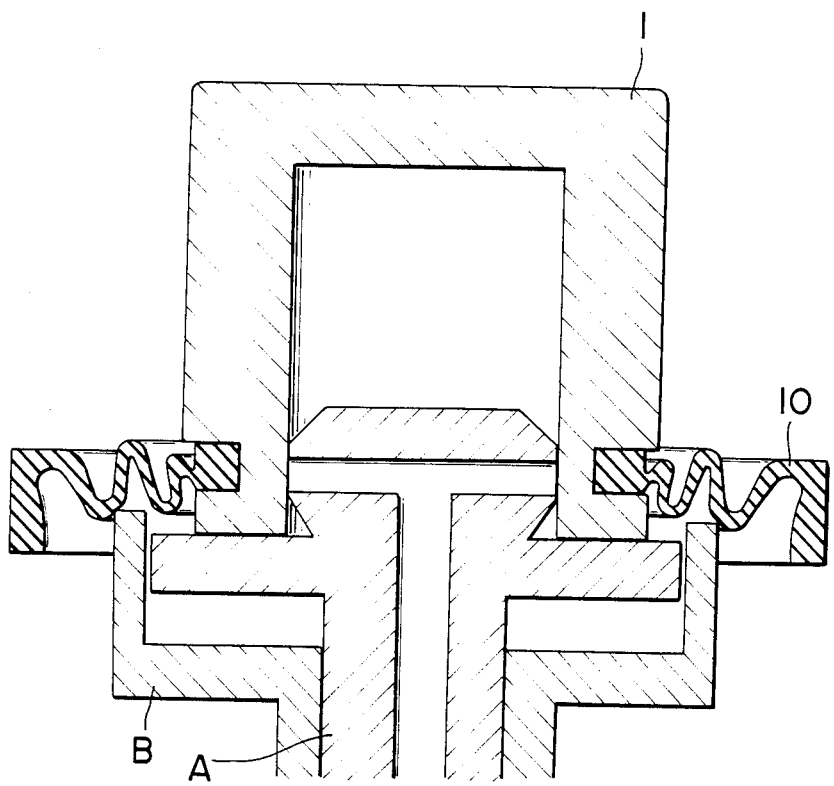

The procedure up to this point constitutes the first process by jig A. Then, as shown in FIG. 5, by pushing up jig B at the side of piston (1), and so pushing up the middle portion of piston boot (10) by upper end of the cylinder portion of expanded diameter, the whole piston boot (10) is moved upward and the inner end portion (10a) is fitted into the fitting groove (3). Through this second process, the integration is finished.

As described above, the invention has made it possible by utilizing the expandability of the rubber parts of the piston boot to integrate the piston boot into the piston automatically using the integrating tool, so that drastic labor savings has been achieved compared with conventional handwork.

What is claimed as new and desired to be secured by Letters Patent of the United States is:

1. A method of integrating a piston boot into a disc brake, comprising the steps of:
    setting said piston boot at a middle portion of a cylinder jig, said middle portion being positioned between a small diameter upper step portion and a large diameter lower step portion and having radial air blow off vents;
    inserting said upper step portion into an inner circumferential face of a piston while simultaneously advancing said lower step portion towards an end face of said piston from which said inner circumferential face extends and blowing air from said blow off vents, whereby said piston boot is radially expanded by said air and is fitted on an outer circumference of said piston adjacent said end face;
    advancing a cup form jig slidably fitted around said lower step portion into engagement with said piston boot and further advancing said cup form jig and said piston boot until said piston boot is fitted into a piston boot fitting portion of said piston.

2. The method of claim 1 wherein said middle portion comprises a column portion defining a groove, and said setting step comprises inserting an inner end portion of said piston boot in said groove.

* * * * *